US009690978B2

(12) United States Patent
Yamada et al.

(10) Patent No.: US 9,690,978 B2
(45) Date of Patent: Jun. 27, 2017

(54) INFORMATION PROCESSING APPARATUS, INFORMATION PROCESSING AND PROGRAM

(71) Applicant: NEC Hong Kong Limited, Hong Kong (CN)

(72) Inventors: Hiroshi Yamada, Tokyo (JP); Nobuhisa Shiraishi, Tokyo (JP); Eric Lau, Hong Kong (CN); Elsa Wong, Hong Kong (CN)

(73) Assignee: NEC HONG KONG LIMITED, Hong Kong (CN)

( * ) Notice: Subject to any disclaimer, the term of this patent is extended or adjusted under 35 U.S.C. 154(b) by 0 days.

(21) Appl. No.: 15/021,246

(22) PCT Filed: Sep. 12, 2014

(86) PCT No.: PCT/JP2014/074271
§ 371 (c)(1),
(2) Date: Mar. 10, 2016

(87) PCT Pub. No.: WO2015/037713
PCT Pub. Date: Mar. 19, 2015

(65) Prior Publication Data
US 2016/0224824 A1 Aug. 4, 2016

(30) Foreign Application Priority Data
Sep. 13, 2013 (JP) ................................. 2013-190081

(51) Int. Cl.
G06K 9/00 (2006.01)
G07D 11/00 (2006.01)
(52) U.S. Cl.
CPC ..... *G06K 9/00255* (2013.01); *G06K 9/00234* (2013.01); *G06K 9/00268* (2013.01);
(Continued)

(58) Field of Classification Search
CPC .................................................. G06K 9/00295
See application file for complete search history.

(56) References Cited

U.S. PATENT DOCUMENTS 8,027,523 B2    9/2011   Sun et al.
2002/0176610 A1 11/2002  Okazaki et al.
(Continued)

FOREIGN PATENT DOCUMENTS

JP    2002-041770 A    2/2002
JP    2005-227957 A    8/2005
(Continued)

OTHER PUBLICATIONS

International Search Report (ISR) (PCT Form PCT/ISA/210), in PCT/JP2014/074271, dated Nov. 18, 2014.
Extended European Search Reoort dated Mar. 30, 2017.

*Primary Examiner* — Siamak Harandi
*Assistant Examiner* — Mai Tran
(74) *Attorney, Agent, or Firm* — McGinn IP Law Group, PLLC

(57) ABSTRACT

A time difference measurement system includes: a first face detection unit for detecting face areas from images photographed by first camera and that slices them as face images; a first face feature extraction unit for extracting first face feature amounts from the face images, and a memory that stores the first face feature amounts in association with shooting time instants. The system includes, for a second camera, an analogous second face detection unit, a second overlap deletion unit and a second face feature extraction unit. The system includes: a face collation unit for collating the second face feature amounts with the first face values; and a time difference calculation unit for calculating time difference between the first and second shooting time instants. The system further includes at least one of first and
(Continued)

second overlap deletion units for comparing a plurality of face images sliced from different frames.

20 Claims, 14 Drawing Sheets

(52) U.S. Cl.
CPC ..... *G06K 9/00288* (2013.01); *G06K 9/00295* (2013.01); *G07D 11/0036* (2013.01)

(56) References Cited

U.S. PATENT DOCUMENTS

| | | | |
|---|---|---|---|
| 2006/0093185 A1 | 5/2006 | Kato et al. | |
| 2008/0080748 A1* | 4/2008 | Sukegawa | G06K 9/00288 |
| | | | 382/118 |
| 2011/0199486 A1 | 8/2011 | Moriya | |
| 2013/0111509 A1* | 5/2013 | Guo | G06K 9/00677 |
| | | | 725/12 |
| 2013/0259299 A1* | 10/2013 | Srinivasan | G06K 9/00778 |
| | | | 382/103 |
| 2014/0161316 A1* | 6/2014 | Golan | G06Q 30/0201 |
| | | | 382/103 |

FOREIGN PATENT DOCUMENTS

| | | |
|---|---|---|
| JP | 2006-221355 A | 8/2006 |
| JP | 2007-190076 A | 8/2007 |
| JP | 2012-108681 A | 6/2012 |
| JP | 2013-161109 A | 8/2013 |
| WO | WO 2012/148000 A1 | 11/2012 |

* cited by examiner

FIG. 7

| DATA NUMBER | PERSON ID | LONGI-TUDINAL POSITION | TRANS-VERSE POSITION | HEIGHT | WIDTH | SHOOTING TIME INSTANTS | STATE FLAG |
|---|---|---|---|---|---|---|---|
| 00010 | 00001 | 500 | 600 | 100 | 50 | 12:00:01.5 | 0 |
| 00011 | 00002 | 50 | 50 | 50 | 23 | 12:00:01.5 | 0 |
| 00012 | 00003 | 150 | 320 | 50 | 30 | 12:00:01.5 | 0 |
| 00013 | 00003 | 150 | 350 | 55 | 33 | 12:00:01.7 | 1 |
| 00014 | 00001 | 499 | 590 | 99 | 50 | 12:00:01.7 | 1 |
| 00015 | 00001 | 495 | 581 | 96 | 48 | 12:00:01.9 | 1 |
| | | | | | | | |

FIG. 8

| PERSON ID (BEGINNING TIME) | BEGINNING TIME INSTANTS | PERSON ID (END TIME) | END TIME INSTANTS | EXTENT OF SIMILARITY |
|---|---|---|---|---|
| 00001 | 12:00:01.5 | 01001 | 12:50:13.6 | 0.80 |
| 00003 | 12:00:01.5 | 01005 | 12:55:40.1 | 0.92 |
| | | | | |
| | | | | |
| | | | | |

FIG. 10

| DELETION CONDITION NUMBER | DELETION CONDITION |
|---|---|
| 1 | LEAVE FIRST FOUR FACE IMAGES FROM THE BEGINNING END WITH FACE IMAGE CONDITION OF IMAGE QUALITY > 0.7 AND DELETE REMAINING FACE IMAGES |
| 2 | LEAVE ONLY FIRST FACE IMAGE FROM THE BEGINNING END WITH FACE IMAGE CONDITION OF IMAGE QUALITY > 0.8 AND DELETE REMAINING FACE IMAGES |
| 3 | |
| | |
| | |
| | |

| SELECTION REFERENCE NUMBER | SELECTION REFERENCE | DELETION CONDITION NUMBER |
|---|---|---|
| 1 | NUMBER OF FACE IMAGES IN FRAME <= 10 | 1 |
| 2 | NUMBER OF FACE IMAGES IN FRAME > 10 | 2 |
| 3 | | |
| | | |
| | | |
| | | |

304

INFORMATION PROCESSING APPARATUS, INFORMATION PROCESSING AND PROGRAM

CROSS-REFERENCE TO RELATED APPLICATION

The present application is based on JP Patent Application No. 2013-190081 filed in Japan on Sep. 13, 2013. The total contents of disclosure of the Patent Application of the senior filing date are to be incorporated by reference into the present Application.

TECHNICAL FIELD

This invention relates to an information processing apparatus, an information processing method and a program. It also relates to a time difference measurement system, a time difference measurement method, an image processing apparatus, an image processing method and a program and, more particularly, to an information processing technique which carries out face detection face authentication (collation), as well as to measurement of time difference by applying the technique.

In e.g., a service counter or an automatic teller machine (ATM), it is practiced to measure the waiting time until a service is actually rendered, as an aid in deciding whether the number of contact points available is to be increased or decreased, or in order to inform a user waiting for a service about his/her waiting time.

For measuring the waiting time, a face authentication technique is sometimes used. Specifically, a face image is extracted from a camera image, both at the beginning point and at the end point of the waiting time, and a decision is made on whether or not the person imaged at the beginning point is the same as the person imaged at the end point, using the face authentication technique. A wide variety of known algorithms may be used for the face authentication technique.

In Patent Literature 1, a waiting time measurement system, shown herein in FIG. 14 (equivalent to FIG. 3 of Patent Literature 1) is disclosed. In the waiting time measurement system, first face authentication is done at an entrance (site A) of an automatic transaction apparatus and second face authentication at a location just in front of it (site B). The waiting time is calculated from the difference between the two instants of time the person identity is authenticated.

Patent Literature 1:

JP Patent Kokai Publication No. JP2012-108681 A

SUMMARY

It is assumed that the contents of the total disclosure of the above Patent Literature are incorporated herein by reference. The following analysis is given from the perspective of the present invention.

It should be noted that the following problems persist in the measurement of the waiting time performed on the basis of face authentication. A first one of the problems is that, in extracting face features from the images acquired, it is necessary to process face images contained in a great many frames, thus significantly increasing the processing time. It is noted that extraction of face features is a processing operation in need of a large calculation volume, and the larger the number of face images processed, the greater is the processing volume. It should also be noted that, if the number of face images processed is increased, the collation processing to check person identity of a target person also becomes time-consuming, so that the volume of image data that can be processed is decreased. Moreover, if it is attempted to process a large number of frame images, it would be necessary to use a processing apparatus of higher performance, with the result that the system cost is increased.

The second problem is that it is necessary to provide an enormous data holding area in order to store face images. It is noted that a face image of a person is contained in each of a plurality of frames, so that, in carrying out the face feature extraction, face images need to be registered a large number of times, with the result that it is necessary to provide a memory having an extremely large storage area.

Patent Literature 1 is silent as to the problem of the processing time involved in extraction or collation of face features.

Therefore, there is a need in the art to provide a time difference measurement system which may aid in measuring the time difference in imaging the same person at different sites expeditiously with a low cost device.

According to a first aspect of the present invention, there is provided a time difference measurement system. The time difference measurement system comprises: a first camera; a first face detection unit for detecting face areas respectively from a plurality of images of multiple frames photographed by the first camera and slicing the face areas as face images; a first face feature extraction unit for extracting first face feature amounts respectively from the face images; and a memory that stores the first face feature amounts respectively in association with shooting time instants. The time difference measurement system comprises: a second camera; a second face detection unit for detecting face areas respectively from a plurality of images of multiple frames photographed by the second camera and slicing the face areas as face images; a second face feature extraction unit for extracting second face feature amounts respectively from the face images; and a face collation unit for collating the second face feature amounts with the first face feature amounts stored in the memory, sets a shooting time instant, stored in association with a successfully collated first face feature amount in the memory, as a first time instant, and sets a shooting time instant of a successfully collated second face feature amount as a second time instant; and the information processing apparatus further comprises a time difference calculation unit for calculating a time difference between the first and second time instants. The time difference measurement system further comprises at least one of: a first overlap deletion unit for comparing a plurality of face images that have been sliced by the first face detection unit and that have been sliced from different frames to decide whether or not the plurality of face images compared are of a same person; the first overlap deletion unit deleting a portion of multiple face images decided to be of the same person and delivering face images left over without having been deleted to the first face feature amount extraction unit; and a second overlap deletion unit for comparing a plurality of face images that have been sliced by the second face detection unit and that have been sliced from different frames to decide whether or not the plurality of face images compared are of a same person; the second overlap deletion unit deleting a portion of multiple face images decided to be of the same person and delivering face images left over without having been deleted to the second face feature amount extraction unit.

According to a second aspect of the present invention, there is provided an image processing apparatus for processing a plurality of images of multiple frames photographed by first and second cameras. The image processing apparatus comprises: a first face detection unit for detecting face areas respectively from a plurality of images of multiple frames photographed by the first camera and slicing the face areas as face images; a first face feature extraction unit for extracting first face feature amounts respectively from the face images; a memory that stores the first face feature amounts. The image processing apparatus comprises: a second face detection unit for detecting face areas respectively from a plurality of images of multiple frames photographed by the second camera and slicing the face areas as face images; a second face feature extraction unit for extracting second face feature amounts respectively from the face images; and a face collation unit for collating the second face feature amounts with the first face feature amounts stored in the memory. The image processing apparatus further comprises at least one of: a first overlap deletion unit for comparing a plurality of face images that have been sliced by the first face detection unit and that have been sliced from different frames to decide whether or not the plurality of face images compared are of a same person; the first overlap deletion unit deleting a portion of multiple face images decided to be of the same person and delivering face images left over without having been deleted to the first face feature amount extraction unit; and a second overlap deletion unit for comparing a plurality of face images that have been sliced by the second face detection unit and that have been sliced from different frames to decide whether or not the plurality of face images compared are of a same person; the second overlap deletion unit deleting a portion of multiple face images decided to be of the same person and delivering face images left over without having been deleted to the second face feature amount extraction unit.

According to a third aspect of the present invention, there is provided a time difference measurement method. The time difference measurement method comprises: a first face detection step of detecting face areas respectively from a plurality of images of multiple frames photographed by a first camera and slicing the face areas as face images; and a first face feature amount extraction step of extracting first face feature amounts respectively from the face images. The time difference measurement method comprises: a second face detection step of detecting face areas respectively from a plurality of images of multiple frames photographed by a second camera and slicing the face areas as face images; and a second face feature amount extraction step of extracting second face feature amounts respectively from the face images. The time difference measurement method comprises: a face collation step of collating the second face feature amounts with the first face feature amounts, setting a shooting time instant of a successfully collated first face feature amount as a first time instant, and setting a shooting time instant of a successfully collated second face feature amount as a second time instant; and a time difference calculation step of calculating a time difference between the first and second time instants. The time difference measurement method comprise at least one of: a first overlap deletion step of comparing a plurality of face images that have been sliced by the first face detection step and that have been sliced from different frames to decide whether or not the plurality of face images compared are of a same person; the first overlap deletion step deleting a portion of multiple face images decided to be of the same person and delivering face images left over without having been deleted to the first face feature amount extraction step; and a second overlap deletion step of comparing a plurality of face images that have been sliced by the second face detection step and that have been sliced from different frames to decide whether or not the plurality of face images compared are of a same person; the second overlap deletion step deleting a portion of multiple face images decided to be of the same person and delivering face images left over without having been deleted to the second face feature amount extraction step.

According to a fourth aspect of the present invention, there is provided an image processing method. The image processing method comprises: a first face detection step of detecting face areas respectively from a plurality of images of multiple frames photographed by a first camera and slicing the face areas as face images; and a first face feature amount extraction step of extracting first face feature amounts respectively from the face images. The image processing method comprises: a second face detection step of detecting face areas respectively from a plurality of images of multiple frames photographed by a second camera and slicing the face areas as face images; and a second face feature amount extraction step of extracting second face feature amounts respectively from the face images. The image processing method comprises a face collation step of collating the second face feature amounts with the first face feature amounts. The image processing method comprises at least one of: a first overlap deletion step of comparing a plurality of face images that have been sliced by the first face detection step and that have been sliced from different frames to decide whether or not the plurality of face images compared are of a same person; the first overlap deletion step deleting a portion of multiple face images decided to be of the same person and delivering face images left over without having been deleted to the first face feature amount extraction step; and a second overlap deletion step of comparing a plurality of face images that have been sliced by the second face detection step and that have been sliced from different frames to decide whether or not the plurality of face images compared are of a same person; the second overlap deletion step deleting a portion of multiple face images decided to be of the same person and delivering face images left over without having been deleted to the second face feature amount extraction step.

According to a fifth aspect of the present invention, there is provided a program that causes a computer to execute: first face detection processing of detecting face areas respectively from a plurality of images of multiple frames photographed by a first camera and slicing the face areas as face images; first face feature amount extraction processing of extracting first face feature amounts respectively from the face images; second face detection processing of detecting face areas respectively from a plurality of images of multiple frames photographed by a second camera and slicing the face areas as face images; second face feature amount extraction processing of extracting second face feature amounts respectively from the face images; face collation processing of collating the second face feature amount with the first face feature amounts, setting a shooting time instant of a successfully collated first face feature amount as a first time instant, and setting a shooting time instant of a successfully collated second face feature amount as a second time instant; and a time difference calculation processing of calculating a time difference between the first and second time instants. The program further causes the computer to execute at least one of: first overlap deletion processing of comparing a plurality of face images that have been sliced by the first face detection processing and that have been sliced from different frames to decide whether or not the plurality of face images compared are of a same person; the first overlap deletion processing deleting a portion of multiple face images decided to be of the same person and delivering face images left over without having been deleted to the first face feature amount extraction processing; and second overlap deletion processing of comparing a plurality of face images that have been sliced by the second face detection processing and that have been sliced from different frames to decide whether or not the plurality of face images compared are of a same person; the second overlap deletion processing deleting a portion of multiple face images decided to be of the same person and delivering face images left over without having been deleted to the second face feature amount extraction processing.

According to a sixth aspect of the present invention, there is provided an information processing apparatus for processing a plurality of images of multiple frames photographed by first and second cameras. The information processing apparatus comprises: a first face detection unit for detecting face areas respectively from a plurality of images of multiple frames photographed by the first camera and slicing the face areas as face images; a first face feature extraction unit for extracting first face feature amounts respectively from the face images; a memory that stores the first face feature amounts; a second face detection unit for detecting face areas respectively from a plurality of images of multiple frames photographed by the second camera and slicing the face areas as face images; a second face feature extraction unit for extracting second face feature amounts respectively from the face images; and a face collation unit for collating the second face feature amounts with the first face feature amounts stored in the memory. The information processing apparatus further comprises at least one of: a first overlap deletion unit for comparing a plurality of face images that have been sliced by the first face detection unit and that have been sliced from different frames to decide whether or not the plurality of face images compared are of a same person; the first overlap deletion unit deleting a portion of multiple face images decided to be of the same person and delivering face images left over without having been deleted to the first face feature amount extraction unit; and a second overlap deletion unit for comparing a plurality of face images that have been sliced by the second face detection unit and that have been sliced from different frames to decide whether or not the plurality of face images compared are of a same person; the second overlap deletion unit deleting a portion of multiple face images decided to be of the same person and delivering face images left over without having been deleted to the second face feature amount extraction unit.

According to a seventh aspect of the present invention, there is provided an information processing method, comprising: a first face detection step of detecting face areas respectively from a plurality of images of multiple frames photographed by a first camera and slicing the face areas as face images; a first face feature amount extraction step of extracting first face feature amounts respectively from the face images; a second face detection step of detecting face areas respectively from a plurality of images of multiple frames photographed by a second camera and slicing the face areas as face images; a second face feature amount extraction step of extracting second face feature amounts respectively from the face images; and a face collation step of collating the second face feature amounts with the first face feature amounts. The information processing method further comprises at least one of: a first overlap deletion step of comparing a plurality of face images that have been sliced by the first face detection step and that have been sliced from different frames to decide whether or not the plurality of face images compared are of a same person; the first overlap deletion step deleting a portion of multiple face images decided to be of the same person and delivering face images left over without having been deleted to the first face feature amount extraction step; and a second overlap deletion step of comparing a plurality of face images that have been sliced by the second face detection step and that have been sliced from different frames to decide whether or not the plurality of face images compared are of a same person; the second overlap deletion step deleting a portion of multiple face images decided to be of the same person and delivering face images left over without having been deleted to the second face feature amount extraction step.

According to an eighth aspect of the present invention, there is provided a program that causes a computer to execute: first face detection processing of detecting face areas respectively from a plurality of images of multiple frames photographed by a first camera and slicing the face areas as face images; first face feature amount extraction processing of extracting first face feature amounts respectively from the face images; second face detection processing of detecting face areas respectively from a plurality of images of multiple frames photographed by a second camera and slicing the face areas as face images; second face feature amount extraction processing of extracting second face feature amounts respectively from the face images; and face collation processing of collating the second face feature amount with the first face feature amounts. The program further causes the computer to execute at least one of: first overlap deletion processing of comparing a plurality of face images that have been sliced by the first face detection processing and that have been sliced from different frames to decide whether or not the plurality of face images compared are of a same person; the first overlap deletion processing deleting a portion of multiple face images decided to be of the same person and delivering face images left over without having been deleted to the first face feature amount extraction processing; and second overlap deletion processing of comparing a plurality of face images that have been sliced by the second face detection processing and that have been sliced from different frames to decide whether or not the plurality of face images compared are of a same person; the second overlap deletion processing deleting a portion of multiple face images decided to be of the same person and delivering face images left over without having been deleted to the second face feature amount extraction processing. It should be noted that the program can be presented as a program product stored in a non-transitory computer-readable storage medium.

The present invention provides the following advantages, but not restricted thereto. According to the present invention, there may be provided a time difference measurement system which may aid in measuring the time difference of imaging of the same person at different sites expeditiously using a low cost device.

BRIEF DESCRIPTION OF DRAWINGS

FIG. 7 is a tabulated view showing example face image detection information in the time difference measurement system according to the exemplary embodiment 1.

FIG. 8 is a tabulated view showing example data registered in a collation result database in the time difference measurement system according to the exemplary embodiment 1.

FIG. 10 is a tabulated view showing a deletion condition table in the time difference measurement system according to the exemplary embodiment 2.

FIG. 11 is a tabulated view showing a deletion condition selection reference table in the time difference measurement system according to the exemplary embodiment 2.

PREFERRED MODES

Figure 1:
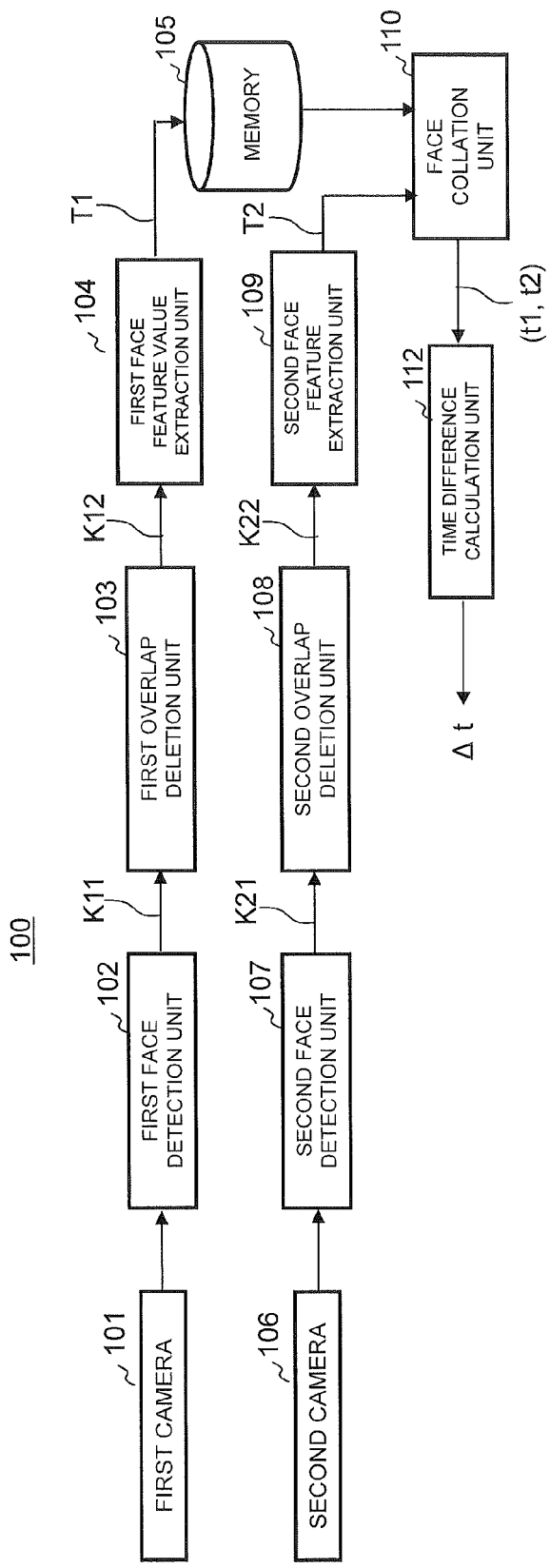
FIG. 1 is a block diagram showing a configuration of a time difference measurement system according to an exemplary embodiment.

The present invention provides various possible modes, which include the following, but not restricted thereto. Initially, an exemplary embodiment according to the present invention will be summarized. It should be noted that reference symbols to the drawings appended to the summary of the preferred exemplary embodiment are merely illustrations to assist in understanding and are not intended to restrict the invention to the modes shown.

A time difference measurement system 100 of the exemplary embodiment measures the time difference Δt between the time when a person was imaged by a first camera 101 and the time when the same person was imaged by a second camera 106. The time difference measurement system 100 includes the first camera 101 and a first face detection unit 102 that detects a face area from each of images of a plurality of frames as photographed by the first camera 101 to slice the so detected face area as a face image K11. The time difference measurement system also includes a first face feature amount extraction unit 104 that extracts a first face feature amount(s) (or face feature value(s)) T1 from the face image and a memory 105 that stores the first face feature amounts t1 as each first face feature amount is correlated with a shooting time instant. The time difference measurement system 100 also includes a second camera 106 and a second face detection unit 107 that detects a face area from each of images of a plurality of frames as photographed by the second camera 106 to slice the so detected face area as a face image K21. The time difference measurement system 100 also includes a second face feature amount extraction unit 109 that extracts a second face feature amount T2 from the face image and a face collation unit 110 that collates the second face feature amount T2 with the first face feature amounts T1 stored in the memory 105 and that sets a shooting time stored in the memory 105, as the shooting time is correlated with the successfully collated first face feature amount T1 and is stored in the memory 105, as a first time instant t1, while setting a shooting time instant of the second face feature amount T2 as a second time instant t2. The time difference measurement system 100 further includes a time difference calculation unit 112 that calculates the time difference between the first time instant t1 and the second time instant t2. Moreover, the time difference measurement system 100 includes at least one of a first overlap deletion unit 103 and a second overlap deletion unit 108. The first overlap deletion unit 103 compares a plurality of face images, sliced from respectively different frames, out of the multiple face images K11 sliced by the first face detection unit 102, to decide whether or not the face images are of the same person. The first overlap deletion unit deletes one or more of the multiple face images decided to be of the same person to deliver face images K12 left undeleted to the first face feature amount extraction unit 104. The second overlap deletion unit 108 compares a plurality of face images, sliced from different frames, out of the multiple face images K21 sliced by the second face detection unit 107, to decide whether or not the face images are of the same person. The second overlap deletion unit deletes one or more of the multiple face images decided to be of the same person to deliver the face images K22 left undeleted to the second face feature amount extraction unit 109.

With the above described arrangement, including at least one of the first overlap deletion unit 103 and the second overlap deletion unit 108, it is possible to significantly reduce the volume of image data from which to extract the face feature amounts. In this manner, the time necessary in the processing of extracting the face features, which is in need of a larger volume of computation, may be diminished to render it possible to provide a time difference measurement system that is performed with the aid of face detection and collation and that allows the time difference to be measured expeditiously using a less costly device.

In the above described time difference measurement system, it is preferred that the first and second overlap deletion units 103, 108 decide whether or not the face images are those of the same person by exploiting the slicing positions of the face images K11, K21, such as the longitudinal and transverse positions in FIG. 7, as well as the shooting time instants of the face images, such as the shooting time instants of FIG. 7.

In the above described time difference measurement system, it is possible for the first and second overlap deletion units 103, 108 to select the face images to be deleted on the basis of shooting time instants of a plurality of face images decided to be of the same person. For example, out of the face images decided to be of the same person, that is, the face images with the same person identifier (ID), those photographed at the earliest shooting time may be left, while deleting the face images with the second and later shooting time instants, with state flags of 1, as shown in the face image detection information 20 shown in FIG. 7.

In the above described time difference measurement system, it is also possible for the first overlap deletion unit 103 and the second overlap deletion unit 108 to select the face images to be deleted on the basis of the image quality of the multiple face images decided to be of the same person.

Figure 9:
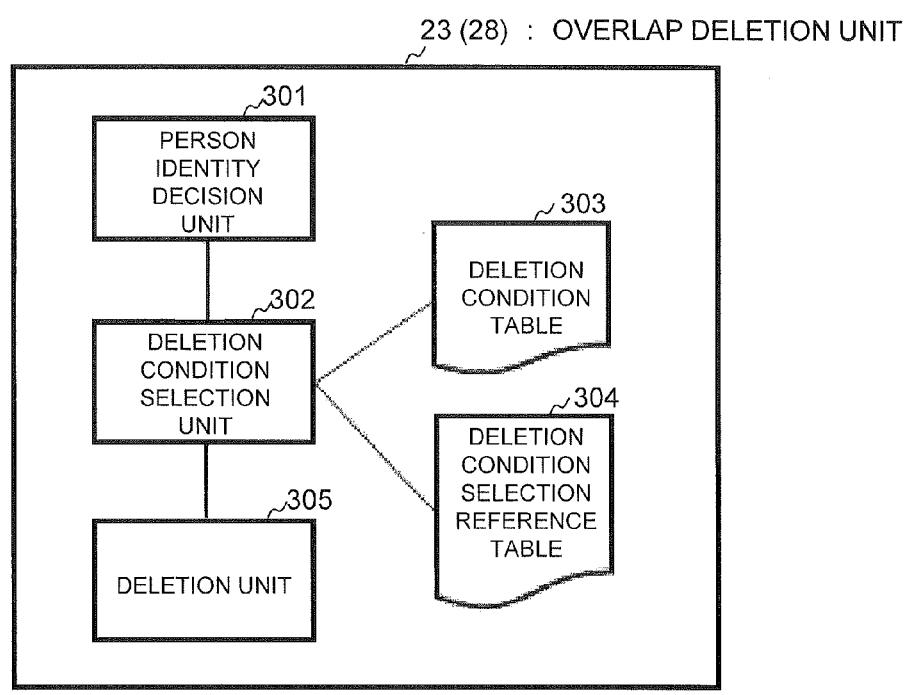
FIG. 9 is a block diagram showing a configuration of an overlap deletion unit in a time difference measurement system according to an exemplary embodiment 2.

In the above described time difference measurement system, the first and second overlap deletion units (23, 28 of FIG. 9) may be provided with a deletion condition table 303, in which there is registered one or more conditions for deletion of the face images, and a deletion condition selection reference table 304, in which there is set a reference(s) of selection of the condition(s) that are to be in use, as shown in FIG. 9 through FIG. 11.

In the above described time difference measurement system, it is preferred that, in case collation of a plurality of the first face feature amounts T1 with respect to one second face feature amount T2 has been made with success, the above mentioned face collation unit (110 of FIG. 1 or 11 of FIG. 3) selects one of the successfully collated multiple first face feature amounts T1 and sets the shooting time instant corresponding to the first face feature amount selected as first time instant t1.

Figure 2:
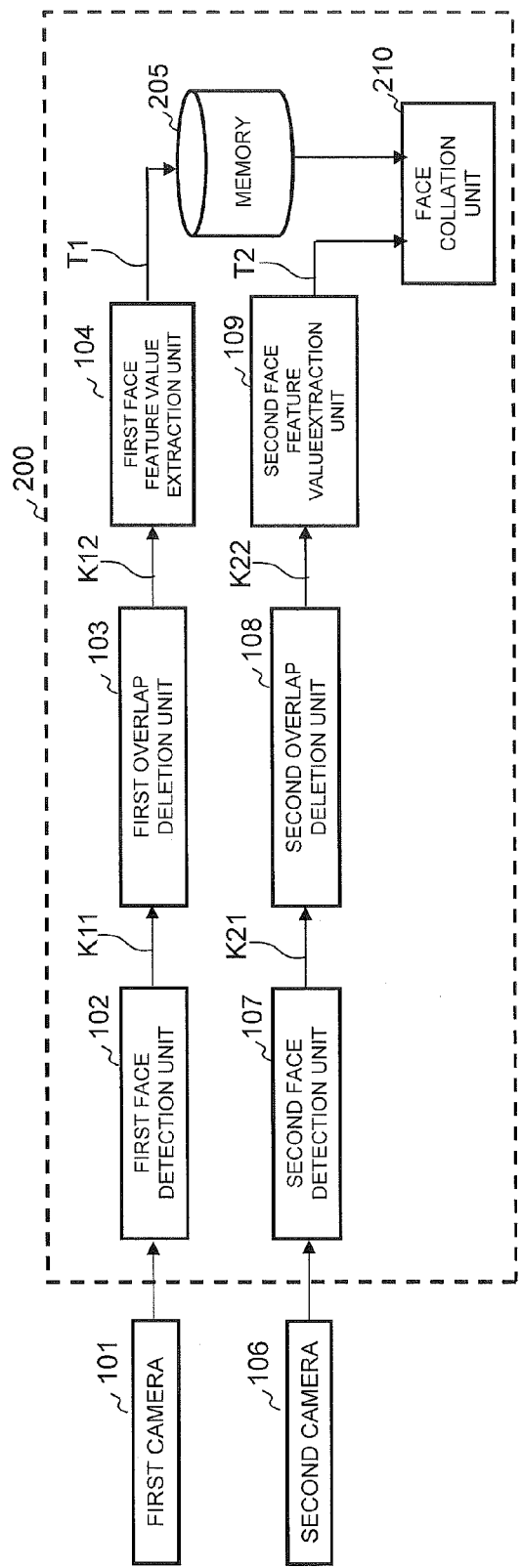
FIG. 2 is a block diagram showing a configuration of an image processing apparatus according to an exemplary embodiment.

An image processing apparatus 200 in an exemplary embodiment, processing an image(s) of a plurality of frames, photographed with the first and second cameras 101, 106, includes a plurality of constituent elements recited below as shown in FIG. 2. That is, the image processing apparatus 200 includes a first face detection unit 102, configured for detecting a face area from an image(s) of a plurality of frames, as photographed by the first camera 101, and slicing the face area as face image K11, a first face feature amount extraction unit 104 and a memory 205. The first face feature amount extraction unit 104 extracts the first face feature amounts T1 from the face image(s) and the memory 205 stores the first face feature amounts T1. The image processing apparatus 200 also includes a second face detection unit 107 configured for detecting a face area from an image(s) of a plurality of frames, as photographed by the second camera 106, and slicing the face area as face image K21. The image processing apparatus 200 also includes a second face feature amount extraction unit 109, configured for extracting a second face feature amount T2 from the face image, and a face collation unit 210 configured for collating the second face feature amount T2 with the first face feature amounts T1 stored in the memory 205. Additionally, the image processing apparatus 200 includes at least one of the first overlap deletion unit 103 and the second overlap deletion unit 108. The first overlap deletion unit 103 compares a plurality of face images, sliced from respective different frames of a plurality of the face images K11, sliced by the first overlap deletion unit 102, to decide whether or not the faces images are those of the same person. The first overlap deletion unit deletes one or more of the multiple face images, decided to be of the same person, and delivers face image(s) K12, left undeleted, to the first face feature amount extraction unit 104. The second overlap deletion unit 108 compares a plurality of face images, sliced from respective different frames, of a plurality of face images K21, sliced by the second face detection unit 107, to decide whether or not the faces images are those of the same person. The second overlap deletion unit deletes one or more of the multiple face images, decided to be of the same person, and delivers the face image(s) K22, left undeleted, to the second face feature amount extraction unit 109.

That is, the image processing apparatus 200 of FIG. 2 has a configuration similar to that of the time difference measurement system of FIG. 1 except not including the first camera 101, second camera 106 or the time difference calculation unit 112. In addition, in the image processing apparatus 200, the memory 205 stores just the first face feature amounts T1 without storing the shooting time instants, and the face collation unit 210 collates the second face feature amount T2 to the first face feature amounts T1 to decide whether or not the face images are those of the same person.

Figure 4:
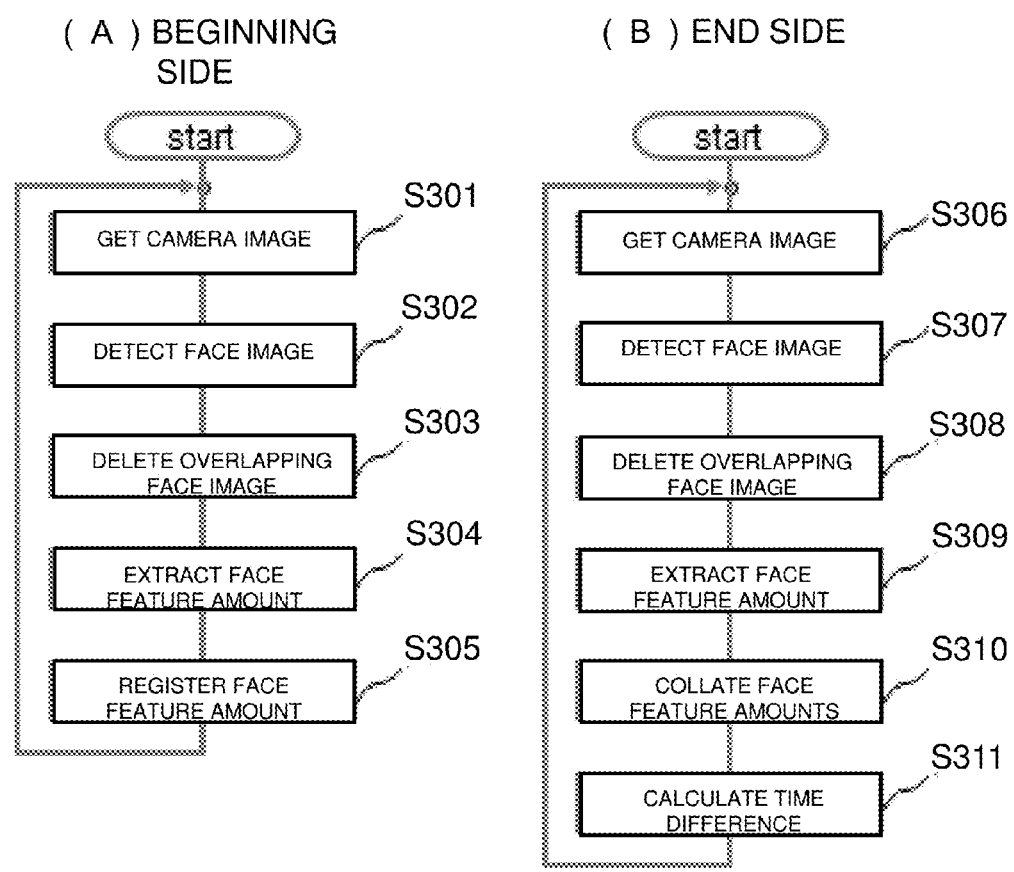
FIG. 4 is a flowchart showing the operation of the time difference measurement system according to the exemplary embodiment 1.

A method for measuring the time difference, according to an exemplary embodiment, measures the time difference Δt between the time instants the same person was imaged by two cameras (the first camera 101 and the second camera 106). The time difference measurement method includes the following steps, as shown in FIG. 1 or FIG. 4. That is, the time difference measurement method includes a first face detection step (S302) of detecting a face area from an image(s) of a plurality of frames, photographed by the first camera 101 (step S301), and slicing the face area as the face image K11, and a first face feature amount extraction step (S304) of extracting the first face feature amounts T1 from the face image. The time difference measurement method includes a second face detection step (S307) of detecting a face area from an image(s) of a plurality of frames, photographed by the second camera 106 (step S306), and slicing the face area as a face image K21, and a second face feature amount extraction step (S309) of extracting the second face feature amount T2 from the face image. The time difference measurement method also includes a face collation step (S310) of collating the second face feature amount T2 with the first face feature amounts T1 to set the shooting time instant of the successfully collated first face feature amounts T1 as the first time instant t1 as well as to set the shooting time instant of the second face feature amount T2 as the second time instant t2. The time difference measurement method also includes a time difference calculation step (S311) of calculating the time difference Δt between the first and second time instants. The time difference measurement method also includes at least one of a first overlap deletion step (S303) and a second overlap deletion step (S308). The first overlap deletion step compares a plurality of the face images K11 that have been sliced by the first face detection step (S302) and that have been sliced from respectively different frames to decide whether or not the face images compared are of the same person. The first overlap deletion step deletes a portion of the multiple face images decided to be of the same person and delivers the face images left over without having been deleted K12 to the first face feature amount extraction step (S304). The second overlap deletion step compares a plurality of the face images K21 that have been sliced by the second face detection step (S307) and that have been sliced from respectively different frames to decide whether or not the face images compared are of the same person. The second overlap deletion step deletes a portion of the multiple face images decided to be of the same person and delivers the face images left over without having been deleted K22 to the second face feature amount extraction step (S309).

Out of the steps included in the above described time difference calculation method, the time difference calculation step (S311) is not included in the image processing method. Additionally, the face collation step only collates the second face feature amount T2 to the first face feature amounts T1. That is, as shown in FIG. 2 or FIG. 4, the image processing method includes the first face detection step (S302) of detecting a face area from images of a plurality of frames photographed by the first camera 101 (S301) to slice the face area as a face image K11 and a first face feature amount extraction step (S304) of extracting the first face feature amounts T1 from the face image. Additionally, the image processing method includes a second face detection step (S307) of detecting a face area from the images of a plurality of frames photographed by second camera 106 (S306) to slice the image area as a face image, and a second face feature amount extraction step (S309) of extracting a second face feature amount T2 from the face image. The image processing method also includes a face collation step of collating the second face feature amount T2 with the first face feature amounts T1 (only the collation operation of S310). The image processing method further includes at least one of a first overlap deletion step (S303) and a second overlap deletion step (S308). The first overlap deletion step (S303) compares a plurality of the face images K11 that have been sliced by the first face detection step (S302) and that have been sliced from respectively different frames to decide whether or not the face images compared are of the same person. The first overlap deletion step deletes a portion of the multiple face images decided to be of the same person and delivers the face images K12 left over without having been deleted to the first face feature amount extraction step (S304). The second overlap deletion step (S308) compares a plurality of the face images K21 that have been sliced by the second face detection step (S307) and that have been sliced from respectively different frames to decide whether or not the face images compared are of the same person. The second overlap deletion step deletes a portion of the multiple face images decided to be of the same person and delivers the face images K22 left over without having been deleted to the second face feature amount extraction step (S309).

The exemplary embodiments of the present invention will now be described in detail in reference to the drawings.

Exemplary Embodiment 1

Configuration of the Exemplary Embodiment 1

Figure 3:
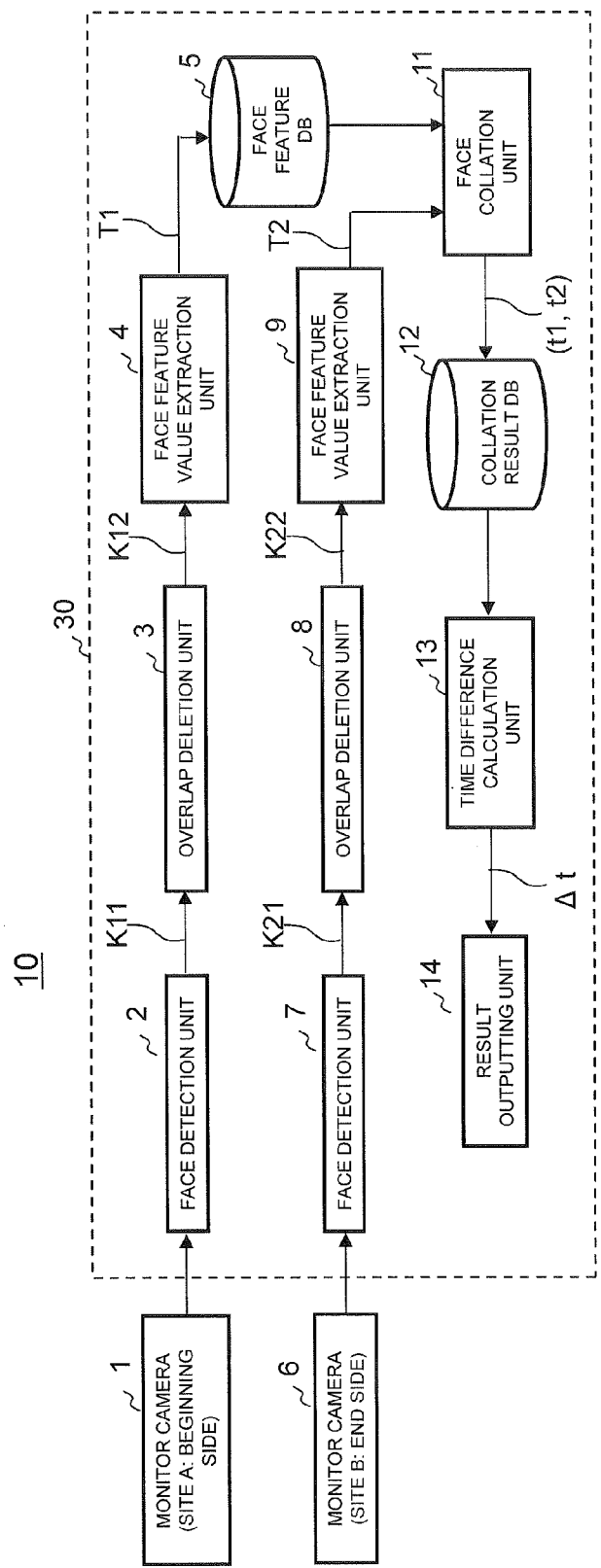
FIG. 3 is a block diagram showing a configuration of a time difference measurement system according to an exemplary embodiment 1.

The configuration of the exemplary embodiment 1 will now be described in detail in reference to FIG. 3 depicting a block diagram showing the configuration of a time difference measurement system 10 according to the exemplary embodiment 1. Referring to FIG. 3, the time difference measurement system 10 is made up of a monitor camera 1 (on the beginning side), a monitor camera 6 (end side) and an image processing apparatus 30. The time difference measurement system 10 has the function of extracting image data of the same person from image data obtained on the monitor camera (on the beginning side) 1 and the monitor camera (on the end side) 6 to measure the time difference involved in imaging the same person.

The time difference measurement system 10 may be used to advantage for measuring e.g., the waiting time. In such case, the monitor camera (on the beginning side) 1 is installed at a beginning point of the waiting time (site A). The beginning point (site A) may, for example, be a trailing end of a queue, an entrance to a waiting room, a reception counter or a neighborhood zone of a numbered ticket issuing device. On the other hand, the monitor camera (on the end side) 6 is installed at an end point of the waiting time (site B). For example, the end point (site B) may be a service counter, equipment, such as ATM, an exit of the waiting room or the neighborhood of an entrance to a service offering site.

Each of the monitor cameras 1, 6 is provided with image sensors utilizing a charge coupled device (CCD) or a complementary metal-oxide semiconductor (CMOS), and outputs a plurality of frame images, as photographed at a preset frame rate, to the image processing apparatus 30.

FIG. 3 depicts a block diagram showing the image processing apparatus 30 on the function basis. The image processing apparatus 30 includes a face detection unit 2, processing image data obtained from the monitor camera 1, an overlap deletion unit 3 and a face feature amount extraction unit 4. The image processing apparatus 30 also includes a face detection unit 7, processing image data obtained from the monitor camera 6, an overlap deletion unit 8 and a face feature amount extraction unit 9. These units will be detailed later.

A face feature database (face feature DB) 5 is storing a first face feature amount(s) T1, calculated by the face feature amount extraction unit 4, as the first face feature amount is correlated with the shooting time instant of the first face feature amount(s) T1. As a device for storage, a hard disk, a solid state drive (SSD) or a memory, for example, may be used. It should be noted that, in the following description, by expressions "face image shooting time instant" or "face feature amount shooting time instant" is to be meant the shooting time instant of an image which is to be the basis of the face image or the face feature amount.

The image processing apparatus 30 also includes a face collation unit 11 that receives a face feature amount T2, output by the face feature amount extraction unit 9, to collate the second face feature amount T2 with the first face feature amounts T1 stored in the face feature DB 5. For collation, it is possible to use any of the known suitable face automatic processing techniques.

A collation result database (collation result DB) 12 registers the shooting time instants of face feature amounts (T1, T2) entered to the face collation unit 11 in case of successful collation. As in the case of the face feature DB 5, a hard disk, a solid state drive (SSD) or a memory, for example, may be used as a storage device.

The image processing apparatus 30 also includes a time difference calculation unit 13 that calculates the time difference Δt between the shooting time instants (t1, t2) of the successfully collated face feature amounts (T1, T2) registered in the collation result DB 12. It should be noted that, if the time difference measurement system 10 is used for measuring the waiting time, the time difference Δt is equivalent to the waiting time.

The image processing apparatus 30 further includes a result outputting unit 14 that outputs the time difference Δt calculated to a monitor, a memory or any other system(s) provided in the image processing apparatus 30.

The processing functions, involved in the above described image processing apparatus 30, are stored in a memory, not shown, as a program executed by a central processing unit (CPU) provided on the image processing apparatus 30, and are invoked by the CPU for execution. By the way, part or all of the processing functions may be implemented on the hardware.

Operation of the Exemplary Embodiment 1

Referring to FIG. 4A and FIG. 4B, the operation of the exemplary embodiment 1 will now be described in detail. FIG. 4A and FIG. 4B depict flowcharts showing the operation of the time difference measurement system 10 according to the exemplary embodiment 1. FIG. 4(A) shows the flowchart illustrating image processing at a beginning side point (site A).

Figure 6:
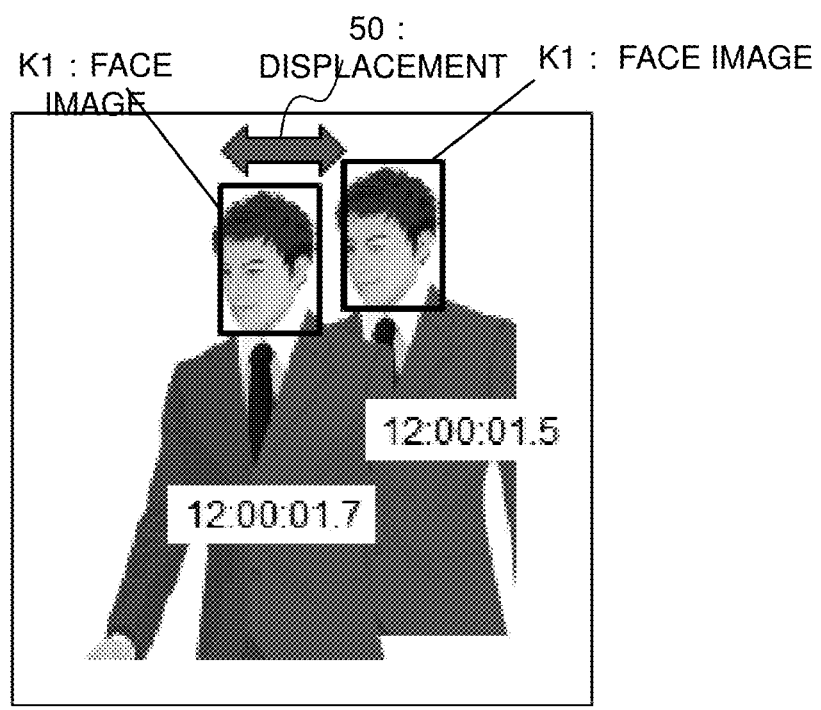
FIG. 6 is a photo for illustrating the overlap deletion unit in the time difference measurement system according to the exemplary embodiment 1.

A camera image is obtained by the monitor camera 1 photographing an image at a preset frame rate (S301). The face detection unit 2 then detects a face image from each frame (S302). The face image detection has a function of detecting a face area portion of each frame to slice the face area portion as a face image, and may be implemented using any suitable known face detection processing techniques. It may sometimes occur that, in a given frame, no face area is detected, or one or more face area is detected. In case the face area has been detected, a rectangular frame area including the face area is sliced and output as a face image, as shown in FIG. 6. In case a plurality of face areas are detected, a plurality of face images are output from the sole frame. It should be noted that the volume of load calculation involved in the face detection processing is less than that involved in face collation processing, described later, such that the face detection processing can be performed in real-time with respect to the imaging frame rate.

The overlap deletion unit 3 then compares a plurality of face images sliced from different ones of respective frames (face images indicated K11 in FIG. 3) to check whether or not the face images are those of the same person. The overlap deletion unit 3 deletes a portion of the multiple face images decided to be of the same person (S303). The face feature amount extraction unit 4 extracts, in a step S304, a first face feature amount (T1 of FIG. 3) from one or more of the multiple face images left undeleted (K12 of FIG. 3), and registers the face feature amount (T1 of FIG. 3) in the face feature DB 5 along with the face position(s) and the shooting time instant(s) (S305). As the face position, a left upper corner position of the rectangular face area frame of FIG. 6 is used, only by way of illustration. It is sufficient that the face position used indicates the face position in the frame area, such that, for example, a position of the center of gravity of the rectangular face area frame may be used.

FIG. 4(B) depicts a flowchart showing image processing at the end side point (site B). Like the monitor camera 1, the monitor camera 6 photographs an image at a preset frame rate to get a camera image (S306). The ensuing processing of S307 through S309 is similar to that of S302 through S304 of FIG. 4(A) and hence is not here recited. By the processing of S307 through S309, the face feature amount (T2 of FIG. 3) extracted from the face image left over following slicing (K21 of FIG. 3) and overlap deletion (K22 of FIG. 3) from the camera image of the monitor camera 6.

The face collation unit 11 then collates the face feature amount (T2 of FIG. 3) extracted in the step S309 with the face feature amounts (T1 of FIG. 3) stored in the face feature DB 5. If the collation is successful, the shooting time t1, registered with the face feature amount (T1 of FIG. 3) in the face feature DB 5, and the shooting time instant t2 of the face feature amount (T2 of FIG. 3), are registered in the collation result database 12 (S310).

The time difference calculation unit 13 then reads out the shooting time instants t1, t2, registered in the collation result database 12, and, in a step S311, calculates the time difference $\Delta t$ (=t2−t1). The result outputting unit 14 then demonstrates the so calculated time difference $\Delta t$ in e.g., a monitor provided in the image processing apparatus 30.

Figure 5:
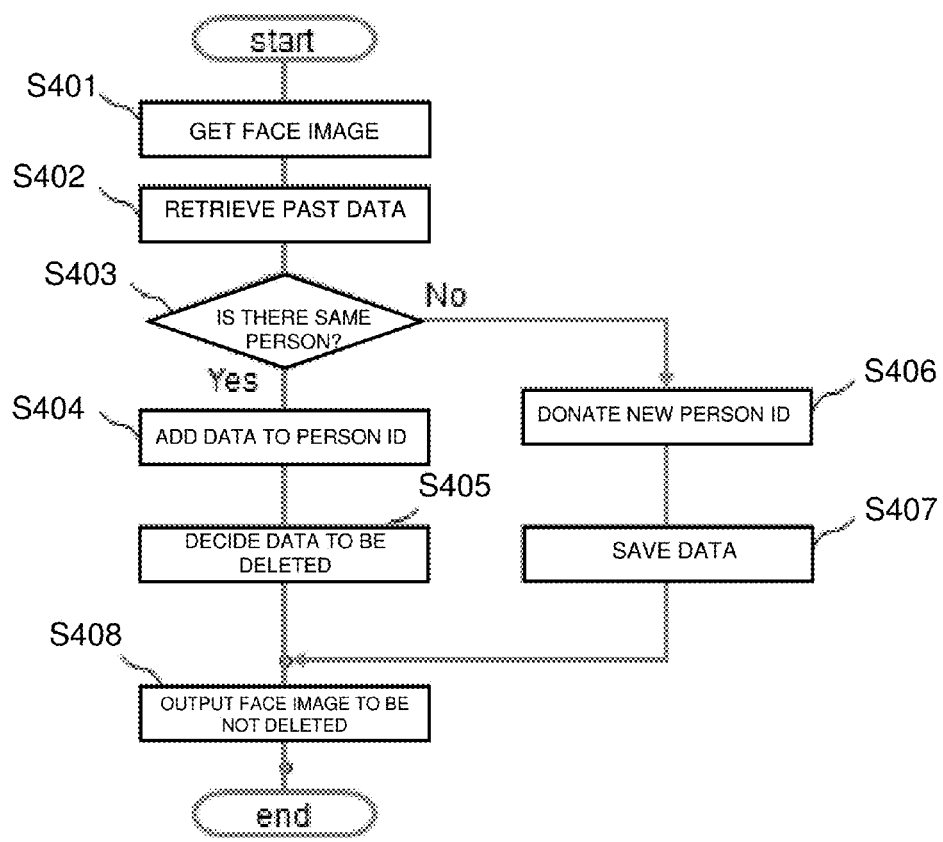
FIG. 5 is a flowchart showing the operation of an overlap deletion unit in the time difference measurement system according to the exemplary embodiment 1.

Referring to FIG. 5, the operation of the overlap deletion unit 3 (S303 of FIG. 3) will be described in detail in reference to FIG. 5.

Initially, the overlap deletion unit 3 receives, from the face detection unit 2, the face image (K11 of FIG. 3), the position and the shooting time instant of the face image (S401). The overlap deletion unit 3 then compares the face image received (K11 of FIG. 3) with the face image of a past frame as to the image position as well as the shooting time instant to decide whether or not the difference of the position as well as the shooting time instant of the face images satisfies a specific condition(s). As such specific conditions, the conditions that the difference in the left upper position of the face image is within a specified number of pixels (condition 1); and the difference in the shooting time instants is within a specified time duration (condition 2) may be used. It should be noted that the "left upper position of the face image" of the condition 1 means a left upper corner position of the rectangular frame to the shape of which the face image is sliced from the frame image.

FIG. 6 shows a position change of a face image entered to the overlap deletion unit 3. Referring to FIG. 6, when time advances 0.2 sec, the face position is shifted leftwards. If a displacement 50 shown in FIG. 6, equivalent to the difference in the left upper positions of the face images, and the time difference, are within specified values, two faces shown are decided to be of the same person. It should be noted that, although the two faces in FIG. 6 are presented in distinct frames, they are shown in an overlapping manner in the figure only for the sake of explanation.

Reverting to FIG. 4, in case a plurality of face images having the displacement 50 and the shooting time instants being within specified values, that is, satisfying the conditions 1 and 2, they are decided to be the face of the same person (Yes in a step S403). The positions and the shooting time instants of the face images are correlated with the person ID and registered in a transient storage area within the overlap deletion unit 3 as the face image detection information 20 (S404). If a plurality of face images are decided to be of the same person, the same person ID is donated to the face images. If conversely the face images are decided to be not of the same person, different person IDs are donated to the face images. In S404, since the multiple face images are decided to be of the same person, the personal ID of past data, decided to be of the same person as the person of the new data, is donated.

After S404, it is decided which face image(s) is to be deleted (S405). The condition(s) of deletion of S405 is desirably modified depending on the use a well as the state of shooting sites. For example, the following conditions for decision may be thought of:

(1) the face images other than the initially photographed sole face image or other than a specified number of face images counting from the beginning face image are deleted;

(2) the face images other than the last photographed face image or other than a specified number of face images counting from the last photographed face image are deleted;

(3) the face image(s) other than the face image with the best image quality or other than a specified number of face images, counting in the order of the falling image quality, are deleted; and (4) a specified number of face images with the image quality not lower than a specified value are left, with the other face images being deleted.

Preferably, the reference(s) of the image quality is whether or not the image in question is beneficial to extraction of face features, and such reference as the size or the extent of face-likeness of the face image is to be used. The values of the image quality are normalized so that the maximum value (the value of the highest image quality) is equal to unity. The image quality may be measured within the overlap deletion means 3, or the results of measurement, obtained externally of the overlap deletion means 3, may be delivered to the overlap deletion unit 3.

On the other hand, if a face of the same person is not found (No in S403), a new person ID is donated to a face image obtained (S406), and data including a position as well as a shooting time instant of the face image obtained is registered, along with a new person ID, in the transient storage area as face image detection information (S407).

The face image(s) decided not to be deleted, that is, the face image(s) other than the face image(s) decided to be deleted in S405, that is, the face image(s) K12 of FIG. 3, is output to the face feature amount extraction unit 4 (S408).

In FIG. 3, processing by the face feature amount extraction unit 4 is carried out after processing by the overlap deletion unit 3. Alternatively, the processing by the face feature amount extraction unit 4 may be started out at the same time as the processing by the overlap deletion unit 3 is commenced. In such case, it may sometimes occur that a decision as to deletion or non-deletion may be made retrogressively on face images that already passed through face feature amount extraction processing.

FIG. 7 depicts an example of the face image detection information 20 registered in the transient storage area. FIG. 7 shows the state in which registration has been made of data numbers, person IDs, positions (longitudinal and transverse positions of left upper corners of a rectangular frame) and sizes (heights and widths) of face images, shooting time instants and status flags indicating the data states, for each face image detected by the face detection unit 2. In FIG. 7, such condition for deletion has been set in which, if there are a plurality of face images, decided to be of the same person, the face image that presents itself first of all is left and the second and ensuing face images are deleted. For example, out of three face images, each with the person ID of 00001, the face image photographed at 12:00:0.1.5 is left as a target of face feature amount extraction, while the face images photographed at 12:00:01.7 and at 12:00:01:9 are deleted.

By the overlap deletion unit 3, the state flag of the data to be deleted is set to 1, while that of the data, which is to be a target for face feature amount extraction, is set to 0. Or, the state flags are initialized at 0 and the state flag of the data, decided to be deleted, may be set to 1 by the overlap deletion unit 3. A state flag indicating an undecided state may also be used, depending on the setting conditions. It is also possible to delete data without employing state flags.

Although the above description with reference to FIG. 5 and FIG. 7 has been made of the overlap deletion unit 3, the overlap deletion unit 8 is similar to the overlap deletion unit 3. Hence, the description of the overlap deletion unit 8 is dispensed with. It is noted however that condition setting for the overlap deletion unit 8, such as setting of the condition(s) for deletion, may be made to be different from that for the overlap deletion unit 3. For example, condition setting for the overlap deletion unit 3 and that for the overlap deletion unit 8 are preferably set depending on the states of the sites A and B where the monitor cameras 1, 6 are installed, respectively.

FIG. 8 shows example collation results registered in the collation result DB 12. Referring to FIG. 8, there is shown registered in the collation result DB 12 the information in case collation has met with success. Here, collation is decided to have met with success in case the degree of similarity in collation is not lower than 0.75. In FIG. 8, data in the first row indicate that collation of a face image on the monitor camera 1 side, with the person ID of 00001 and the shooting time instant of 12:00:01.5, with a face image on the monitor camera 6 side, with the person ID of 01001 and the shooting time instant of 12:50:13.6, has met with success with the degree of similarity of 0.80. On the other hand, data in the second row indicate that collation of a face image on the monitor camera 1 side, with the person ID of 00003 and the shooting time instant of 12:00:01.5, with a face image on the monitor camera 6 side, with the person ID of 01005 and the shooting time instant of 12:55:40.1, has met with success with the degree of similarity of 0.92.

It should be noted that, in case a plurality of face feature amounts have met with success in the face collation unit 11, one of the multiple face feature amounts is selected by performing the following processing operations. Which of these processing operations is to be used may be decided independence upon the states of the shooting sites (sites A or B) as well as the use or applications.
(A) In case a plurality of face features with different person IDs are retrieved,
(A-1) the face feature amount of the person ID with the highest degree of similarity of the face feature amount is selected;
(A-2) the face feature amount having the earliest shooting time instant, out of the face feature amounts retrieved, is selected; or
(A-3) the face feature amount having the latest shooting time instant, out of the face feature amounts retrieved, is selected.
(B) In case a plurality of face features with the same person ID are retrieved,
(B-1) the face feature amount of the person ID with the highest degree of similarity of the face feature amount is selected;
(B-2) the face feature amount having the earliest shooting time instant, out of the face feature amounts retrieved, is selected; or
(B-3) the face feature amount having the latest shooting time instant, out of the face feature amounts retrieved, is selected.
(C) In case a plurality of face features are retrieved, a plurality of combinations of the face feature amounts retrieved are registered in the collation result DB 12, and one of the combinations registered is selected in the time difference calculation unit 13. In selecting one of the combinations, the above mentioned processing operations (A-1) through (A-3) and (B-1) through (B-3) may be applied.

With the time difference measurement system 10 of the exemplary embodiment 1, described above, the following beneficial results may be accrued.

First, the time difference of shooting of the same person at different sites may be measured expeditiously by a low-cost device. In particular, if the time difference of shooting time instants of the same person is the waiting time, it is possible to measure the waiting time expeditiously by a low-cost device. The reason is that, by using overlap deletion processing that can be performed in a shorter calculation time, it is possible to reduce the number of face images put to face feature amount extraction processing that can be achieved only with longer calculation time.

Second, the capacity of memory devices, in which to transiently store data of face feature amounts, such as T1 and T2 of FIG. 3, may be decreased. The reason is that, since the number of face images, processed by the face feature amount extraction unit 4, 9, may be reduced, it is possible to reduce the volume of data of the face feature amounts, such as T1 and T2 of FIG. 3.

The time difference measurement system 10 of the exemplary embodiment 1 may be modified so as to present it as an image processing apparatus that recognizes that the same person has passed through different sites A and B. To this end, it is only sufficient to simplify the image processing apparatus 30 of FIG. 3 so that the device will not be used to perform processing pertaining to the shooting time. Thus, it is only sufficient to dispense with the time difference calculation unit 13 and the collation result DB and store the face feature amounts in the face feature DB 5, while it is unnecessary to store the shooting time. On the other hand, it is only necessary for the face collation unit 11 to collate the face feature amounts and, in case of success in the collation, it is only necessary for the result outputting unit 14 to notify that effect. The image processing apparatus 200 of FIG. 2 is equivalent to the above mentioned image processing apparatus.

Exemplary Embodiment 2

An exemplary embodiment 2 will now be described with reference to FIG. 9 through FIG. 11. The subject exemplary embodiment 2 differs from the exemplary embodiment1 in that the overlap deletion means 3, 8 are replaced respectively by overlap deletion unit 23, 28.

FIG. 9 depicts a block diagram showing the configuration of the overlap deletion unit 23 in the exemplary embodiment 2. Referring to FIG. 9, the overlap deletion unit 23 includes a person identity decision unit 301, a deletion condition selection unit 302, a deletion processing unit 305, a deletion condition table 303 and a deletion condition selection reference table 304. Since the overlap deletion unit 28 is similar to the overlap deletion unit 23, the following description is made only of the overlap deletion unit 23, and description of the overlap deletion unit 28 is not made.

The deletion condition table 303 states the deletion condition(s) of one or more face images. FIG. 10 shows an example of the deletion condition table 303. Referring to FIG. 10, a deletion condition number 1 leaves up to initial four face images, with the image quality not lower than 0.7, decided to be of the same person, in the order the images are generated, while deleting the remaining face images. A deletion condition number 2 leaves only the first face image, with the image quality not lower than 0.8, decided to be of the same person, in the order the images are generated, while deleting the remaining face images. In the example of FIG. 10, with the deletion condition number 2, the number of the face images deleted becomes greater than with the deletion condition number 1. The position where the face is presented, or the time difference from the time of generation of the directly previously presented face image, for example, may also be used as the deletion conditions in addition to the image quality.

The deletion condition selection reference table 304 states the reference to select one of the multiple conditions of deletion stated in the deletion condition table 303. FIG. 1 shows an example of the deletion condition selection reference table 304. Referring to FIG. 11, a selection reference number 1 indicates that, in case the number of face images sent from the face detection unit 2 to the overlap deletion unit 3 is not greater than 10 per frame, the deletion condition number 1 of the deletion condition table 303 is to be selected. FIG. 11 also shows that, in case the number of face images sent from the face detection unit 2 to the overlap deletion unit 3 exceeds 10 per frame, the deletion condition number 2 of the deletion condition table 303 is to be selected. Thus, if the number of the face images is increased, the number of the face images deleted is increased to reduce the processing load in the downstream side processing stages. In addition to the number of face images, the shooting time instants, the state of use of resources, such as CPU or memories, may also be used for selection.

Reverting to FIG. 9, the person identity decision unit 301 performs the processing equivalent to S402, S403 of FIG. 5. That is, the person identity decision unit retrieves past data to check whether or not the face image generated is the face image of the same person. The deletion condition selection unit 302 refers to the deletion condition table 303 and the deletion condition selection reference table 304 to select the condition for deletion that is to be used. Also, on the basis of the condition for deletion selected, the deletion processing unit 305 deletes one or more of the multiple face images decided to be of the same person and sent to the overlap deletion unit 23.

With the time difference measurement system of the exemplary embodiment 2, described above, it is possible to obtain the following beneficial results. In the exemplary embodiment 2, the conditions for deletion in the overlap deletion unit 23, 28 may be modified using the deletion condition table 303 and the deletion condition selection reference table 304. It is thus possible to modify e.g., the face image processing load as well as the data volume in dependence upon the states of the monitors (sites A and B) or the system.

The exemplary embodiments 1, 2 may be modified in the following manner. First, only one of the two overlap deletion unit may be provided. That is, in the exemplary embodiment 1, it is only necessary to provide one of the overlap deletion unit 3, 8 and, in the exemplary embodiment 2, it is only necessary to provide one of the overlap deletion unit 23, 28. If only one of the two overlap deletion unit 3, 8 is provided, the work load on the face collation unit 11, consuming much calculation time, may be reduced to a more or less extent.

Second, the face image values, output by the face feature amount extraction unit 9, may be transiently stored in a memory, after which the collation processing or the time difference calculation processing may be performed. If real-time processing is unnecessary, it is possible to use e.g., idle time processing or nighttime batch processing.

Third, it is possible for the face detection unit 2, 7 to calculate the image quality of the face image, such as its size or extent of face-likeness, to output the so calculated image quality along with the face image. In such case, the overlap deletion unit 3, 8 or 23, 28 uses the image quality, calculated by the face detection unit 2, 7, in deciding the face image(s) to be deleted.

Fourth, the image processing apparatus 30 of FIG. 3 may be split into two parts. On one of the apparatus parts, there may be loaded the functions of processing the image of the monitor camera 1, such as those of the face detection unit 2, overlap deletion unit 3, face feature amount extraction unit 4 and the face feature DB 5. On the other apparatus part, there may be loaded the functions of processing an image of the monitor camera 6, such as those of the face detection unit 7, overlap deletion unit or the face feature amount extraction unit 9. The other unit, such as the face collation unit 11, collation result DB 12, time difference calculation unit 13 and the result outputting unit 14, may be loaded on the first or second apparatus part so that the processing of collation or time difference calculation may be performed on the first or second loading side apparatus part. The first and second apparatus parts are interconnected so as to allow communication with each other over a wire or by radio connection. The information necessary for collation or time difference calculation, such as the face feature amounts extracted or the shooting time instants, needs to be transmitted to the apparatus part designed to perform the processing operations.

The image processing apparatus 30 of FIG. 3 may be split into three apparatus parts, as shown in FIG. 5. For example, on a first apparatus part, there may be loaded the functions of processing the image of the monitor camera 1, such as those of the face detection unit 2, overlap deletion unit 3, face feature amount extraction unit 4 and the face feature DB 5. On the second apparatus part, there may be loaded the functions of processing an image of the monitor camera 6, such as those of the face detection unit 7, overlap deletion unit 8 or the face feature amount extraction unit 9. On the third apparatus part, the remaining apparatus parts, such as face collation unit 11, collation result DB 12, time difference calculation unit 13 and the result outputting unit 14, may be loaded to carry out the processing of collation and time difference calculation. The first and second apparatus parts are connected with the third apparatus part so as to allow communication with the third apparatus part over a wire or by radio connection so as to enable the information including the face feature amounts extracted and the information including the shooting time instants to be transmitted to the third apparatus part.

Like the exemplary embodiment 1, the time difference measurement system of the exemplary embodiment 2 may be modified to present it as an image processing apparatus that recognizes that the same person has passed through different sites A and B.

Exemplary Embodiment 3

Figure 12:
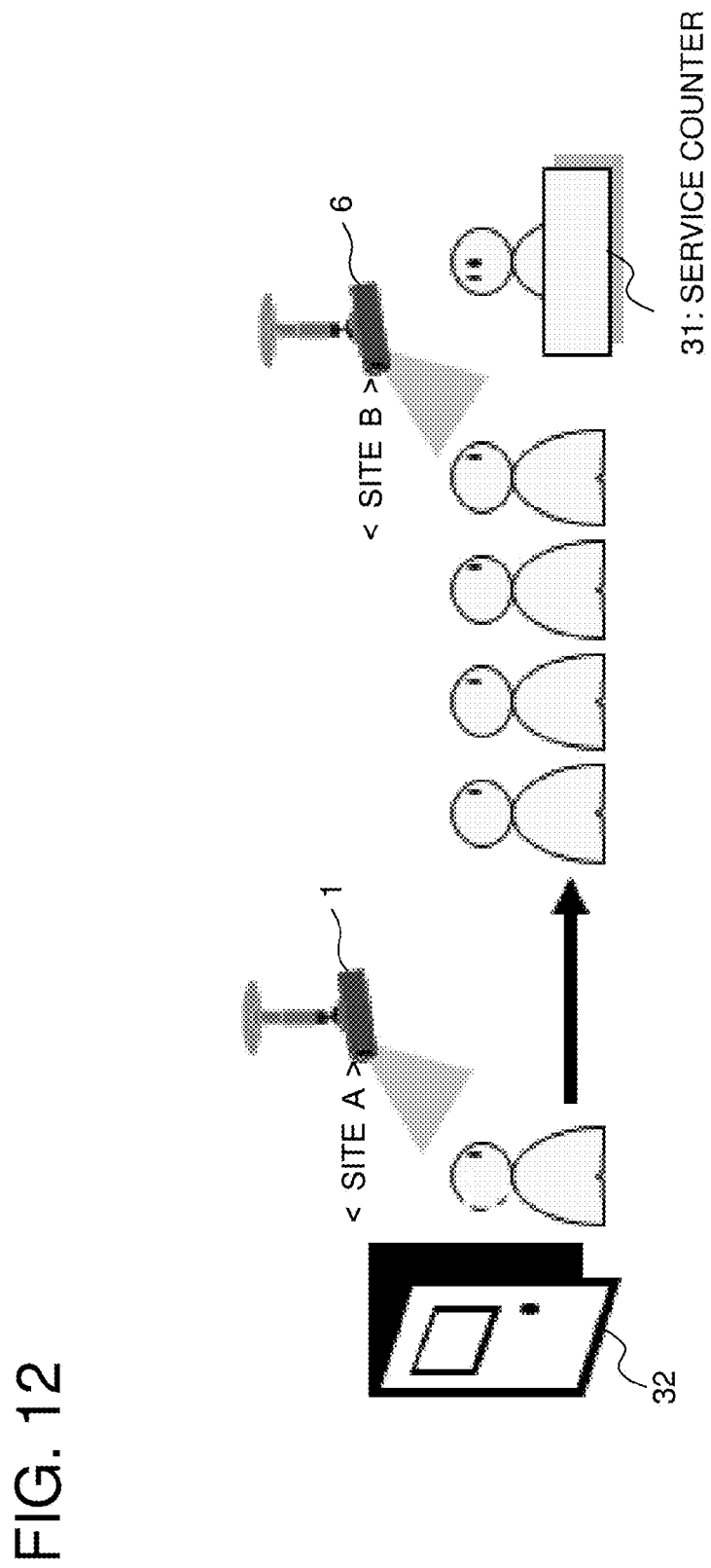
FIG. 12 is a schematic view showing a waiting time measurement system according to an exemplary embodiment 3.

An exemplary embodiment 3 will now be described in reference to FIG. 12. In this figure, schematically showing the waiting time measurement system according to the exemplary embodiment 3, there is shown an example of a system that measures the waiting time in a waiting queue before a service counter. Referring to FIG. 12, there are provided a monitor camera 1 imaging an entrance 32 to a waiting area and a camera 6 that images the service counter 31 with its neighborhood. An image processing apparatus (30 of FIG. 3) of the exemplary embodiment 1 is used as an image processing apparatus that processes camera images photographed by the monitor cameras 1, 6.

In the overlap deletion unit 3, there is set a deletion condition that a first appearing one of face images, decided to be of the same person, is left as a target of face feature amount extraction, with the remaining face images being deleted. In the overlap deletion unit 8, there is set a deletion condition that the last one of face images, decided to be of the same person, is left as a target of face feature amount extraction, with the remaining face images being deleted.

By selecting the target image of face feature amount extraction as described above, it is possible to prevent the waiting time from being measured to an excessively small value.

Exemplary Embodiment 4

Figure 13:
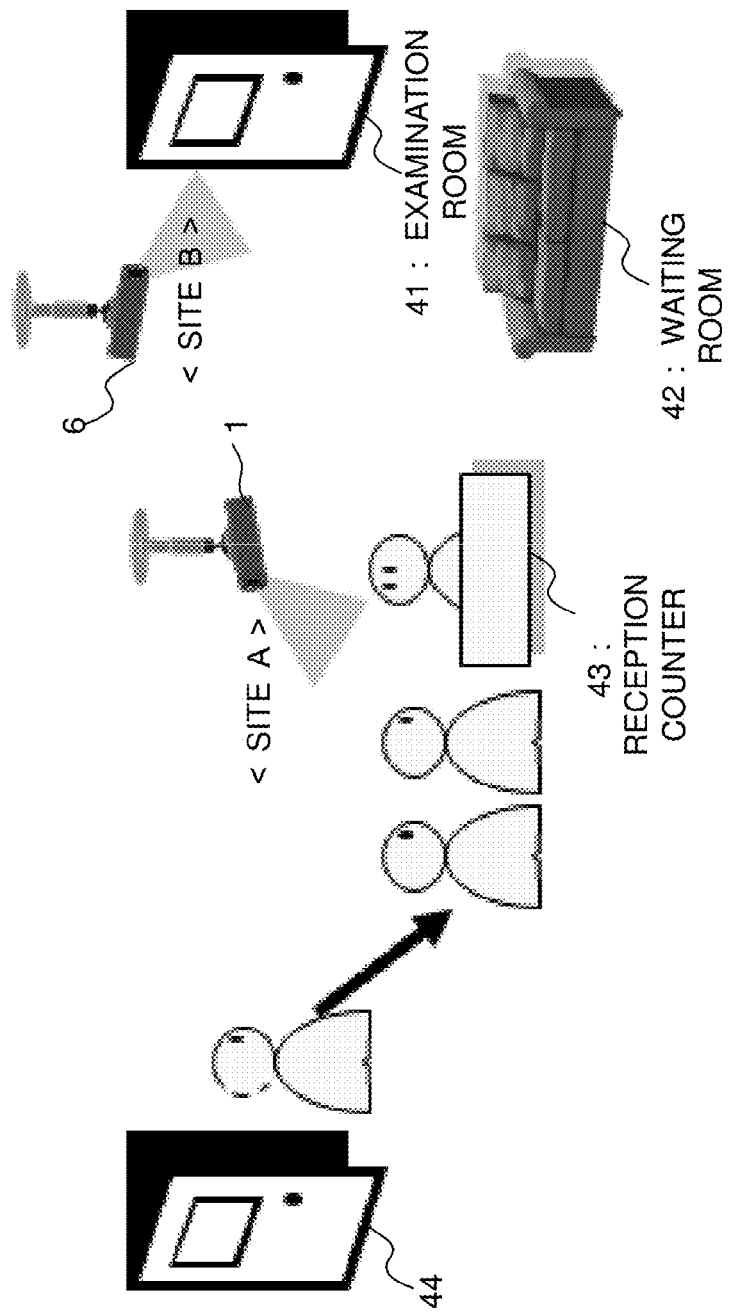
FIG. 13 is a schematic view showing a waiting time measurement system according to an exemplary embodiment 4.
Figure 14:
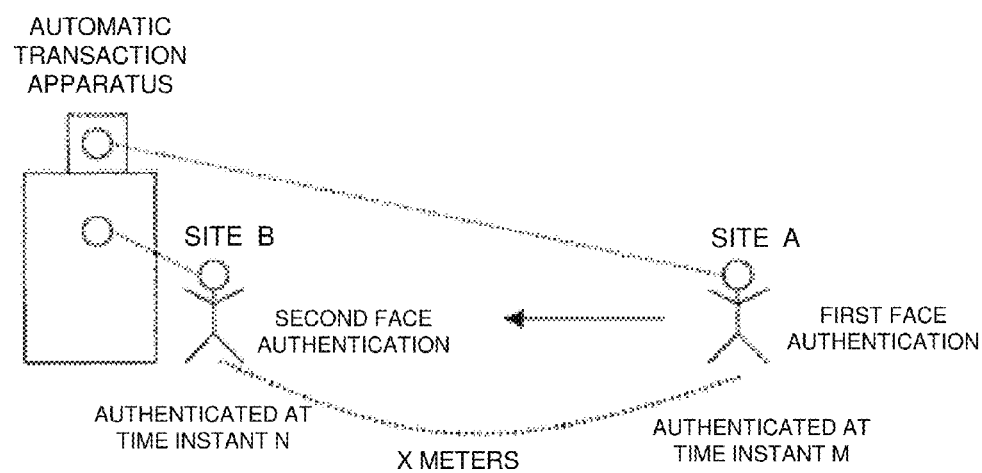
FIG. 14 is a schematic view showing an automatic cache transaction apparatus exploiting face authentication according to a related technique.

An exemplary embodiment 4 will be described in reference to FIG. 13. In this figure, there is schematically shown an example of a waiting time measurement system according to the exemplary embodiment 4. In this example system, it is possible to measure the waiting time in a place in a hospital where there are a reception counter 43 and a waiting room 42. The waiting time is the time that elapses since acceptance at the reception counter 43 until the service including medical examination in an examination room 41 commences. Referring to FIG. 13, there are provided a monitor camera 1 that images the reception counter 43 and a camera 6 that images an entrance to the examination room 41. The image processing apparatus (30 of FIG. 3) is used as an image processing apparatus processing camera images obtained with the monitor cameras 1, 6.

In the overlap deletion unit 3, there is set a deletion condition that, to remove the waiting time before the reception counter, the last one of face images, decided to be of the same person, is left as a target of face feature amount extraction, with the remaining face images being deleted. In the overlap deletion unit 8, there is simply set a deletion condition that, since no crowded state may be estimated to persist at the entrance to the examination room 41, a first appearing one of face images, decided to be of the same person, is left as a target of face feature amount extraction, with the remaining face images being deleted.

With the waiting time measurement system of the exemplary embodiments 3 and 4, described above, it is possible to measure the waiting time highly accurately as the setting of the overlap deletion unit is changed depending on the state of shooting sites or use. By the way, the deletion condition table 303 and the deletion condition selection reference table 304 may be used in the exemplary embodiments 3 and 4.

In the above described exemplary embodiment 3 and 4, it is the waiting time that is measured. However, the time difference measurement system of the present invention is not limited to measurement of the waiting time and may be used for a variety of applications in which the time difference is measured for the same person by cameras provided in two distinct places.

In the above described exemplary embodiments, the processing operations executed by the image processing apparatus 30, including those of S302 through S305 and S307 through S311, are stored as programs in a memory device, not shown, provided in the image processing apparatus 30. The so stored programs may be invoked for execution by a CPU, not shown, provided in the image processing apparatus 30. The programs may be downloaded over a network or updated using a storage medium in which the programs are stored.

Part or all of the above described exemplary embodiments may be summarized as in the modes shown below only by way of illustration.

(Mode 1)
See a time difference measurement system according to the above mentioned first aspect.
(Mode 2)
The time difference measurement system according to mode 1, wherein
the first overlap deletion unit and the second overlap deletion unit decide whether or not the plurality of face images are of the same person, using slicing positions and shooting time instants of the plurality of face images.
(Mode 3)
The time difference measurement system according to mode 1 or 2, wherein
the first overlap deletion unit and the second overlap deletion unit select face images to be deleted based on shooting time instants of face images decided to be of the same person.
(Mode 4)
The time difference measurement system according to mode 1 or 2, wherein
the first overlap deletion unit and the second overlap deletion unit select face images to be deleted based on image qualities of face images decided to be of the same person.
(Mode 5)
The time difference measurement system according to any one of modes 1 to 4, wherein
the first and second overlap deletion unit comprise:
a deletion condition table that stores one or more deletion conditions for deleting a face image(s); and a deletion condition selection reference table in which a reference for selecting a deletion conditions to be used among the one or more deletion conditions is set.

(Mode 6)

The time difference measurement system according to any one of modes 1 to 5, wherein in case of success of collation of multiple of the first face feature amounts with one of the second face feature amounts, the face collation unit selects one of the successfully collated multiple first face feature amounts and sets a shooting time instant of the selected first face feature amount as the first time instant.

(Mode 7)

The time difference measurement system according to any one of modes 1 to 6, wherein the first camera is a camera that images a scene of a beginning of a waiting time, the second camera is a camera that images a scene of an end of the waiting time, and the time difference calculated by the time difference calculation means is the waiting time.

(Mode 8)

See an image processing apparatus according to the above mentioned second aspect.

(Mode 9)

The image processing apparatus according to mode 8, wherein the first overlap deletion unit and the second overlap deletion unit decide whether or not the plurality of face images are of the same person, using slicing positions and shooting time instants of the plurality of face images.

(Mode 10)

The image processing apparatus according to mode 8 or 9, wherein the first overlap deletion unit and the second overlap deletion unit select face images to be deleted based on shooting time instants of face images decided to be of the same person.

(Mode 11)

The image processing apparatus according to mode 8 or 9, wherein the first overlap deletion unit and the second overlap deletion unit select face images to be deleted based on image qualities of face images decided to be of the same person.

(Mode 12)

The image processing apparatus according to any one of modes 8 to 11, wherein the first and second overlap deletion unit comprise:

a deletion condition table that stores one or more deletion conditions for deleting a face image(s); and a deletion condition selection reference table in which a reference for selecting a deletion conditions to be used among the one or more deletion conditions is set.

(Mode 13)

The image processing apparatus according to any one of claims 8 to 12, wherein, the memory stores the first face feature amounts respectively in association with shooting time instants, the face collation unit collates the second face feature amounts with the first face feature amounts stored in the memory, sets a shooting time instant, stored in association with a successfully collated first face feature amount in the memory, as a first time instant, and set a shooting time instant of a successfully collated second face feature amount as a second time instant, and the information processing apparatus further comprises time difference calculation unit for calculating a time difference between the first and second time instants.

(Mode 14)

See a time difference measurement method according to the above mentioned third aspect.

(Mode 15)

The time difference measurement method according to mode 14, wherein the first and second overlap deletion steps decide whether or not the plurality of face images are of the same person, using slicing positions and shooting time instants of the plurality of face images.

(Mode 16)

The time difference measurement method according to mode 14 or 15, wherein the first and second overlap deletion steps select the face images to be deleted based on shooting time instants of face images decided to be of the same person.

(Mode 17)

The time difference measurement method according to mode 14 or 15, wherein the first and second overlap deletion steps select face images to be deleted based on image qualities of face images decided to be of the same person.

(Mode 18)

The time difference measurement method according to any one of modes 14 to 17, wherein in case of success of collation of multiple of the first face feature amounts with one of the second face feature amounts, the face collation step selects one of the successfully collated multiple first face feature amounts and sets a shooting time instant of the selected first face feature amount as the first time instant.

(Mode 19)

See an image processing method according to the above mentioned fourth aspect.

(Mode 20)

The image processing method according to mode 19, wherein the first and second overlap deletion steps decide whether or not the plurality of face images are of the same person, using slicing positions and shooting time instants of the plurality of face images.

(Mode 21)

The image processing method according to mode 19 or 20, wherein the first and second overlap deletion steps select the face images to be deleted based on shooting time instants of face images decided to be of the same person.

(Mode 22)

The image processing method according to mode 19 or 20, wherein the first and second overlap deletion steps select face images to be deleted based on image qualities of face images decided to be of the same person.

(Mode 23)

See a program according to the above mentioned fifth aspect.

The time difference measurement system of the present invention may be applied to measurement of the waiting time. Specifically, the system is usable for estimating the extent of satisfaction on the part of a customer or for giving a decision on increasing/decreasing the number of service counters so as to improve the extent of the customer's satisfaction by measuring the waiting time until the time a service is rendered to the customer. The present invention may also be applied to an image processing method which efficiently collates a face of a person imaged at a given site with a face of the same person imaged at another site.

It should be noted that the exemplary embodiments and Examples may be modified or adjusted within the concept of the total disclosures of the present invention, inclusive of claims, based on the fundamental technical concept of the invention. A diversity of combinations or selections of elements herein disclosed (including claims and drawings) may be made within the context of the claims of the present invention. It should be understood that the present invention may include a wide variety of changes or corrections that may occur to those skilled in the art in accordance with the total disclosures inclusive of the claims and the drawings as well as the technical concept of the invention. In particular, any optional numerical figures or sub-ranges contained in the ranges of numerical values set out herein ought to be construed to be specifically stated even in the absence of explicit statements.

1 monitor camera (beginning side)
2, 7 face detection unit
3, 8, 23, 28 overlap deletion unit
4, 9 face feature extraction unit
5 face feature database
6 monitor camera (end side)
10, 100 time difference measurement system
11, 110, 210 face collation unit
12 collation result database
13, 112 time difference calculation unit
14 result outputting unit
20 face image detection information
30, 200 image processing apparatus
31 service counter
32, 44 entrance
41 examination room
42 waiting room
43 reception counter
50 displacement
101 first camera
102 first face detection unit
103 first overlap deletion unit
104 first face feature amount extraction unit
105, 205 memory
106 second camera
107 second face detection unit
108 second overlap deletion unit
109 second face feature amount extraction unit
301 person identity decision unit
302 deletion condition selection unit
303 deletion condition table
304 deletion condition selection reference table
305 deletion processing unit
K11, K12, K21, K22 face image
T1 first face feature amount
T2 second face feature amount
t1 first time instant (shooting time instant)
t1 second time instant (shooting time instant)
Δt time difference

What is claimed is:

1. An information processing apparatus for processing a plurality of images of multiple frames photographed by first and second cameras, the information processing apparatus comprising:
   a first face detection unit for detecting face areas respectively from a plurality of images of multiple frames photographed by the first camera and slicing the face areas as face images;
   a first face feature extraction unit for extracting first face feature amounts respectively from the face images;
   a memory that stores the first face feature amounts;
   a second face detection unit for detecting face areas respectively from a plurality of images of multiple frames photographed by the second camera and slicing the face areas as face images;
   a second face feature extraction unit for extracting second face feature amounts respectively from the face images; and
   a face collation unit for collating the second face feature amounts with the first face feature amounts stored in the memory, wherein
   the information processing apparatus further comprises at least one of:
   a first overlap deletion unit for comparing a plurality of face images that have been sliced by the first face detection unit and that have been sliced from different frames to decide whether or not the plurality of face images compared are of a same person; the first overlap deletion unit deleting a portion of multiple face images decided to be of the same person and delivering face images left over without having been deleted to the first face feature amount extraction unit; and
   a second overlap deletion unit for comparing a plurality of face images that have been sliced by the second face detection unit and that have been sliced from different frames to decide whether or not the plurality of face images compared are of a same person; the second overlap deletion unit deleting a portion of multiple face images decided to be of the same person and delivering face images left over without having been deleted to the second face feature amount extraction unit.

2. The infatuation processing apparatus according to claim 1, wherein
   the memory stores the first face feature amounts respectively in association with shooting time instants,
   the face collation unit sets a shooting time instant, stored in association with a successfully collated first face feature amount in the memory, as a first time instant, and sets a shooting time instant of a successfully collated second face feature amount as a second time instant, and
   the information processing apparatus further comprises time difference calculation unit for calculating a time difference between the first and second time instants.

3. The information processing apparatus according to claim 1, wherein
   the first overlap deletion unit and the second overlap deletion unit decide whether or not the plurality of face images are of the same person, using slicing positions and shooting time instants of the plurality of face images.

4. The information processing apparatus according to claim 1, wherein
   the first overlap deletion unit and the second overlap deletion unit select face images to be deleted based on shooting time instants of face images decided to be of the same person.

5. The information processing apparatus according to claim 1, wherein
   the first overlap deletion unit and the second overlap deletion unit select face images to be deleted based on image qualities of face images decided to be of the same person.

6. The information processing apparatus according to claim 1, wherein
   the first and second overlap deletion unit comprise:
   a deletion condition table that stores one or more deletion conditions for deleting a face image(s); and
   a deletion condition selection reference table in which a reference for selecting a deletion conditions to be used among the one or more deletion conditions is set.

7. The information processing apparatus according to claim 2, wherein
in case of success of collation of multiple of the first face feature amounts with one of the second face feature amounts, the face collation unit selects one of the successfully collated multiple first face feature amounts and sets a shooting time instant of the selected first face feature amount as the first time instant.

8. The information processing apparatus according to claim 2, wherein
the first camera comprises a camera that images a scene of a beginning of a waiting time,
the second camera comprises a camera that images a scene of an end of the waiting time, and
the time difference calculated by the time difference calculation unit is the waiting time.

9. An information processing method, comprising:
a first face detection step of detecting face areas respectively from a plurality of images of multiple frames photographed by a first camera and slicing the face areas as face images;
a first face feature amount extraction step of extracting first face feature amounts respectively from the face images;
a second face detection step of detecting face areas respectively from a plurality of images of multiple frames photographed by a second camera and slicing the face areas as face images;
a second face feature amount extraction step of extracting second face feature amounts respectively from the face images; and
a face collation step of collating the second face feature amounts with the first face feature amounts, wherein
the information processing method further comprises at least one of:
a first overlap deletion step of comparing a plurality of face images that have been sliced by the first face detection step and that have been sliced from different frames to decide whether or not the plurality of face images compared are of a same person; the first overlap deletion step deleting a portion of multiple face images decided to be of the same person and delivering face images left over without having been deleted to the first face feature amount extraction step; and
a second overlap deletion step of comparing a plurality of face images that have been sliced by the second face detection step and that have been sliced from different frames to decide whether or not the plurality of face images compared are of a same person; the second overlap deletion step deleting a portion of multiple face images decided to be of the same person and delivering face images left over without having been deleted to the second face feature amount extraction step.

10. The information processing method according to claim 9, further comprising:
a face collation step of setting a shooting time instant of a successfully collated first face feature amount as a first time instant and setting a shooting time instant of a successfully collated second face feature amount as a second time instant; and
a time difference calculation step of calculating a time difference between the first and second time instants.

11. The information processing method according to claim 9, wherein
the first and second overlap deletion steps decide whether or not the plurality of face images are of the same person, using slicing positions and shooting time instants of the plurality of face images.

12. The information processing method according to claim 9, wherein,
the first and second overlap deletion steps select the face images to be deleted based on shooting time instants of face images decided to be of the same person.

13. The information processing method according to claim 9, wherein
the first and second overlap deletion steps select face images to be deleted based on image qualities of face images decided to be of the same person.

14. The information processing method according to claim 10, wherein
in case of success of collation of multiple of the first face feature amounts with one of the second face feature amounts, the face collation step selects one of the successfully collated multiple first face feature amounts and sets a shooting time instant of the selected first face feature amount as the first time instant.

15. A non-transitory computer-readable recording medium storing a program that causes a computer to execute:
first face detection processing of detecting face areas respectively from a plurality of images of multiple frames photographed by a first camera and slicing the face areas as face images;
first face feature amount extraction processing of extracting first face feature amounts respectively from the face images;
second face detection processing of detecting face areas respectively from a plurality of images of multiple frames photographed by a second camera and slicing the face areas as face images;
second face feature amount extraction processing of extracting second face feature amounts respectively from the face images; and
face collation processing of collating the second face feature amount with the first face feature amounts; wherein
the program further causes the computer to execute at least one of:
first overlap deletion processing of comparing a plurality of face images that have been sliced by the first face detection processing and that have been sliced from different frames to decide whether or not the plurality of face images compared are of a same person; the first overlap deletion processing deleting a portion of multiple face images decided to be of the same person and delivering face images left over without having been deleted to the first face feature amount extraction processing; and
second overlap deletion processing of comparing a plurality of face images that have been sliced by the second face detection processing and that have been sliced from different frames to decide whether or not the plurality of face images compared are of a same person; the second overlap deletion processing deleting a portion of multiple face images decided to be of the same person and delivering face images left over without having been deleted to the second face feature amount extraction processing.

16. The information processing apparatus according to claim 2, wherein
the first overlap deletion unit and the second overlap deletion unit decide whether or not the plurality of face images are of the same person, using slicing positions and shooting time instants of the plurality of face images.

17. The information processing apparatus according to claim 2, wherein
the first overlap deletion unit and the second overlap deletion unit select face images to be deleted based on shooting time instants of face images decided to be of the same person.

18. The information processing apparatus according to claim 2, wherein
the first overlap deletion unit and the second overlap deletion unit select face images to be deleted based on image qualities of face images decided to be of the same person.

19. The information processing apparatus according to claim 2, wherein
the first and second overlap deletion units comprise:
a deletion condition table that stores one or more deletion conditions for deleting a face image(s); and
a deletion condition selection reference table in which a reference for selecting a deletion conditions to be used among the one or more deletion conditions is set.

20. The information processing apparatus according to claim 3, wherein
the first overlap deletion unit and the second overlap deletion unit select face images to be deleted based on shooting time instants of face images decided to be of the same person.

* * * * *